United States Patent [19]

Aso

[11] Patent Number: 4,918,830

[45] Date of Patent: Apr. 24, 1990

[54] METHOD OF PREPARING A PERMANENT MAGNET DC MACHINE

[76] Inventor: Hiroaki Aso, Mitsubishi Denki Kabushiki Kaisha Himeji Seisakusho, 840, Chiyoda-cho, Himeji-shi, Hyogo-ken, Japan

[21] Appl. No.: 326,648

[22] Filed: Mar. 21, 1989

[30] Foreign Application Priority Data

Apr. 12, 1988 [JP] Japan .................................. 63-89430

[51] Int. Cl.$^5$ ............................................ H02K 15/02
[52] U.S. Cl. ........................................ 29/596; 310/42; 310/154
[58] Field of Search .................... 29/596, 578; 340/42, 340/153-156, 216, 218, 254, 258

[56] References Cited

U.S. PATENT DOCUMENTS

| | | | |
|---|---|---|---|
| 4,554,474 | 11/1985 | Morishita et al. | 310/154 |
| 4,580,072 | 4/1986 | Morishita | 310/154 |
| 4,794,291 | 12/1988 | Abukawa et al. | 310/154 |

Primary Examiner—Carl E. Hall

[57] ABSTRACT

A permanent magnet DC machine is prepared by attaching auxiliary magnetic poles having higher reversible permeability than that of main magnetic poles constituted by anisotropic permanent magnets which are to be attached to the inner circumferential surface of a yoke by welding;

arranging a non-magnetic substance having a triangular shape in cross section to a side surface of each of the auxiliary magnetic poles and the inner circumferential surface of the yoke so as to form a leakage magnetic path breaking section at the radially outer part of each of the non-magnetic substances so that the length of the leakage magnetic path breaking section is greater than the air gap formed between a rotor and a stator; positioning the main magnetic poles of anistropic permanent magnets with respect to the other side surface of each of the non-magnetic substances and the inner circumferential surface of the yoke; and fixing main magnetic poles by an adhesive agent or by inserting forcibly a plate spring in a channel form in gaps between the main and auxiliary magnetic poles.

11 Claims, 5 Drawing Sheets

METHOD OF PREPARING A PERMANENT MAGNET DC MACHINE

BACKGROUND OF THE INVENTION

1. FIELD OF THE INVENTION

The present invention relates to a permanent magnet DC machine. More particularly, the present invention relates to a method of preparing a permanent magnet DC machine having a stator in which anisotropic permanent magnets are used as main magnetic poles and auxiliary magnetic poles having higher reversible permeability than that of the main magnetic poles are respectively arranged adjacent to the main magnetic poles.

2. DISCUSSION OF BACKGROUND

In conventional permanent magnet DC machines such as starters, auxiliary magnetic poles made of a material such as soft iron are arranged at a side of main magnetic poles to increase magnetic function of the main magnetic poles against demagnetization due to armature reaction as disclosed in, for instance, Japanese Examined Patent Publication Sho 48-35721. In more detail, a stator is provided with the main magnetic poles made of anisotropy permanent magnets whose both ends are cut along the lines extending in parallel to the center line radially extending from the center of a rotor, and the auxiliary magnetic poles of soft iron each adjoining each of the main magnetic poles with an air gas in the circumferential direction, or each of the auxiliary magnetic poles is entirely in contact with a side surface of each of the main magnetic poles.

However, as well known, the anisotropic permanent magnet allows a magnetic flux to pass in the radial direction. Accordingly, when the auxiliary magnetic poles are arranged in the circumferential direction (the direction of rotation) so as to be in close-contact with the main magnetic poles, leakage magnetic paths are formed between the main and auxiliary magnetic poles in a close-contacting state. Thus, in the permanent magnet DC machine with the main and auxiliary magnetic poles whose opposing faces are entirely in close-contact with each other reduces its an effective magnetic flux, whereby a rotating torque decreases.

On the other hand, in the permanent magnet DC machine with the main and auxiliary magnetic poles in which air gaps are formed between the adjacent main and auxiliary magnetic poles in the circumferential direction (the direction of rotation), there is found a steep depression in the waveform of magnetic flux distribution at the time of the application of a high load at the armature side of the rotor because the air gaps are formed in the circumferential direction over the entire length, even though the leakage magnetic path can be reduced. Accordingly, a smooth operation of the DC machine can not be expected. Further, the generation of magnetic sounds and vibrations take place at the same time of reduction of power. In addition, from the viewpoint of the construction, it is difficult to determine positions of the main and auxiliary magnetic poles because of the presence of air gaps, and accordingly effective assembling works can not be obtained.

SUMMARY OF THE INVENTION

It is an object of the present invention to provide a method of preparing a permanent magnetic DC machine capable of smoothing a waveform of magnetic flux distribution, increasing a rotating torque and facilitating assembling works.

In one aspect of the present invention, there is provided a method of preparing a permanent magnet DC machine which comprises: attaching by welding auxiliary magnetic poles having higher reversible permeability than that of main magnetic poles constituted by anisotropic permanent magnets which are to be attached to the inner circumferential surface of a yoke; joining a non-magnetic substance having a triangular shape in cross section to a side surface of each of the auxiliary magnetic poles and the inner circumferential surface of the yoke so as to form a leakage magnetic path breaking section at the radially outer part of each of the non-magnetic substances, the length of the leakage magnetic path breaking section being greater than the air gap formed between a rotor and a stator; positioning the main magnetic poles of anistropic permanent magnets with respect to the other side surface of each of the non-magnetic substances and the inner circumferential surface of the yoke; and fixing by an adhesive agent the main magnetic poles on the inner circumferential surface so as to adjoin the auxiliary magnetic poles through the non-magnetic substances.

In another aspect of the present invention, there is provided a method of preparing a permanent magnet DC machine which comprises: attaching by welding auxiliary magnetic poles having higher reversible permeability than that of main magnetic poles constituted by anisotropic permanent magnets which are to be attached to the inner circumferential surface of a yoke; arranging a non-magnetic substance having a triangular shape in cross section to a side surface of each of the auxiliary magnetic poles and the inner circumferential surface of the yoke so as to form a leakage magnetic path breaking section at the radially outer part of each of the non-magnetic substances, the length of the leakage magnetic path breaking section being greater than the air gap formed between a rotor and a stator; positioning the main magnetic poles of anistropic permanent magnets with respect to the other side surface of each of the non-magnetic substances and the inner circumferential surface of the yoke; and fixing the main magnetic poles by a pressing force obtained by inserting elastic members between the main magnetic poles and the auxiliary magnetic poles as field magnetic poles which are adjacent to each other.

BRIEF DESCRIPTION OF DRAWINGS:

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Preferred embodiments of the present invention will be described with reference to the drawings.

In FIGS. 1 to 4, a reference numeral 1 designates a stator in a DC machine; a numeral 2 designates a yoke made of a magnetic substance such as iron, a numeral 3 designates main magnetic poles of anisotropic permanent magnets fixed to the inner circumferential surface of the yoke 2 with an adhesive 31, wherein four main magnetic poles are arranged on the inner circumferential surface at equidistance and they are magnetized in the radial direction so that the adjacent magnetic poles are different from each other, and a numeral 4 designates four auxiliary magnetic poles of a material having higher reversible permeability than that of the main magnetic poles, such as soft iron. The auxiliary magnetic poles 4 are arranged in such a manner that each of the auxiliary magnetic poles is disposed adjacent to each of the main magnetic poles; the auxiliary magnetic poles are attached to the inner circumferential surface of the yoke 2 by welding; they are respectively in contact with the adjacent main magnetic poles at the radially inner part; and leakage magnetic path breaking sections 5 are formed between each adjacent pairs of main and auxiliary magnetic poles 3, 4 at the radially outer part. The length of the outer circular arc portion of each of the leakage magnetic path breaking sections 5 is so determined as to be greater than a small gap a between the outer circumference of the rotor and the inner surface of the main and auxiliary magnetic poles attached to the yoke. A numeral 6 designates non-magnetic substances made of a resinous material which fill the leakage magnetic path breaking sections 5. The rotor 7 is rotatable in the direction as indicated by an arrow mark in FIG. 1 keeping a small gap to the main and auxiliary magnetic poles 3, 4 in the radial direction. A numeral 8 designates an armature core facing the main and auxiliary magnetic poles 3, 4 with the air gap a, a numeral 9 designates an armature coil wound around the armature core, a numeral 10 designates a commutator, and a numeral 11 designates an armature shaft.

Assembling work for the stator in the above-mentioned embodiment are carried out as follows.

Figure 1:
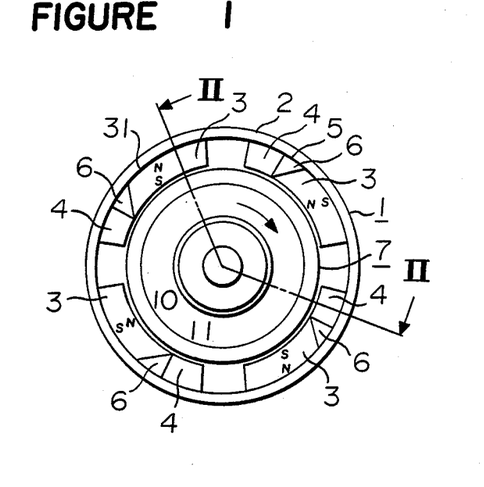
FIG. 1 is a front view of an embodiment of the permanent magnet DC machine according to the present invention.
Figure 2:
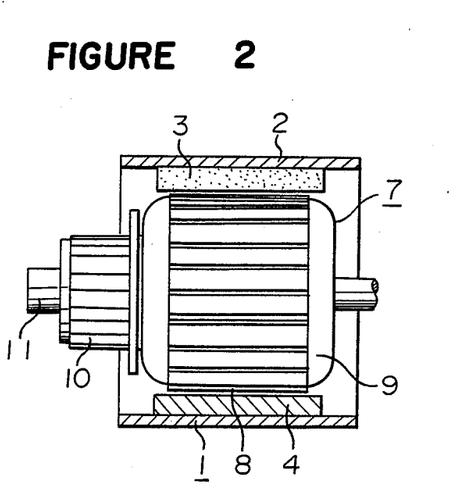
FIG. 2 is a cross-sectional view taken along a line II—II in FIG. 1.
Figure 3:
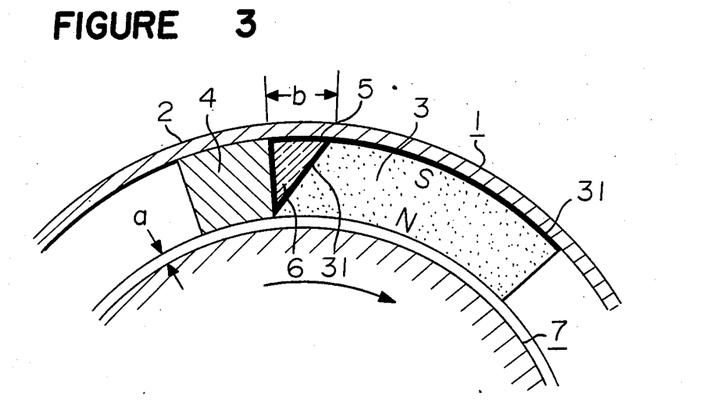
FIG. 3 is an enlarged cross-sectional view showing an important part of the embodiment as shown in FIG. 1.
Figure 4:
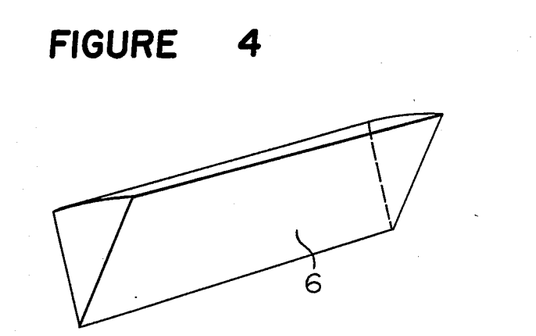
FIG. 4 is a perspective view showing a non magnetic substance used for the embodiment as shown in FIG. 1.

The auxiliary magnetic poles 4 are attached to the inner circumferential surface of the yoke 2 by welding. Then, the non-magnetic substances 6 are fixed to the inner circumferential surface of the yoke 2 with an adhesive agent 31 so that a side portion of each of the non-magnetic substances 6 is joined to a side of each of the auxiliary magnetic poles 4. The main magnetic poles 3 are positioned by using the right end surface of the non-magnetic substance 6 as a reference surface as shown in FIG. 3. Thereafter, each of the main magnetic poles 3 is attached to the inner circumferential surface of the yoke 2 and the right end surface of the non-magnetic substance 6 with the adhesive agent 31. Then, the rotor 7 is inserted into thus assembled stator 1, whereby the air gap a is formed between the armature core 8 and the main and auxiliary magnetic poles 3, 4.

In the above mentioned embodiment, the leakage magnetic path breaking sections 5 having the outer circular arc portion whose length b is greater than the air gap a are provided, and the non-magnetic substances 6 are provided in the breaking sections 5, whereby leakage magnetic paths between the adjacent main and auxiliary magnetic poles 3, 4 are interrupted by the non-magnetic substances 6, with the result that leakage fluxes can be minimized, and a torque can be increased.

Figure 5:
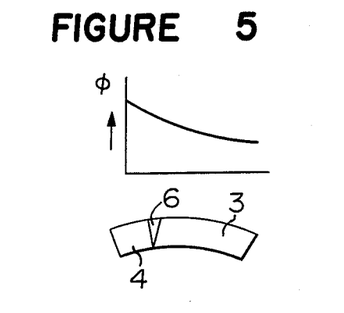
FIG. 5 is a diagram showing a magnetic flux distribution obtained by the embodiment as shown in FIG. 1.

In this embodiment, the main magnetic poles 3 are in contact with the adjacent auxiliary magnetic poles 4 at the radially inner part, and therefore, there is no gap along the inner circumference which opposes the outer circumference of the rotor 7. Accordingly, a waveform which shows the distribution of magnetic flux is smooth as shown in FIG. 5, whereby output characteristics are improved and magnetic noises and vibrations are minimized. Further, assembling work can be easy because the non-magnetic substances 6 can be used as position-determining means when the main magnetic poles 3 are assembled.

In the above-mentioned embodiment, the leakage magnetic path breaking sections 5 are extended to reach the radially inner end of the stator 1, and therefore the non-magnetic substances 6 are formed to be relatively large. However, the embodiment as shown in FIGS. 1 through 4 may be modified to have a shape as shown in FIGS. 6 and 7.

Figure 6:
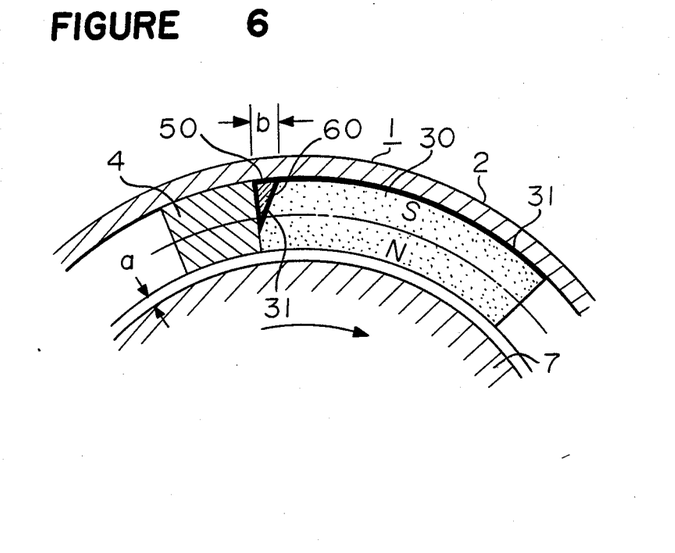
FIG. 6 is an enlarged cross-sectional view showing another embodiment of a stator used for a permanent magnet DC machine according to the present invention.
Figure 7:
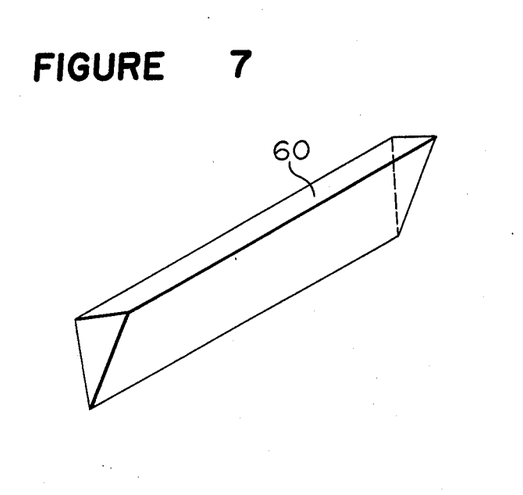
FIG. 7 is a perspective view of a non magnetic substance used for the embodiment as shown in FIG. 6.

Namely, in FIGS. 6 and 7, main magnetic poles 30 of anisotropic permanent magnets are so provided as to form leakage magnetic path breaking sections 50 in association with the adjacently positioned auxiliary magnetic poles 4 so that the apex of the breaking section 50 opposing its outer circular arc portion extends to substantially the middle portion in the radial direction of the main magnetic pole. The length d of the circular arc portion, i.e. the length along the circumferential direction of the outermost diameter part of each of the breaking sections 50 is so determined as to be greater than the air gap a formed between the outer periphery of the rotor 7 and the inner circumference of the stator 1. A numeral 60 designates non-magnetic substances of a molded resinous body having a generally triangular shape in cross-section filled in the breaking sections 50, the non-magnetic substances being joined respectively to the inner circumferential surface of the yoke 2 with an adhesive agent 31.

Assembling work for the field magnetic poles used for this embodiment are carried out as follows.

The auxiliary magnetic poles 4 are attached to the inner circumferential surface of the yoke 2 by welding. Then, the non-magnetic substances 60 are joined to the right side surface of each of the auxiliary magnetic poles 4 and the inner circumferential surface of the yoke 2 with the adhesive agent 31. Thereafter, the positions of the main magnetic poles 30 are determined by using the right side surfaces of the non-magnetic substances 60 and the auxiliary magnetic poles 4 and the inner circumferential surface of the yoke 2 before bonding them with the adhesive agent 31.

In the above-mentioned embodiment, the leakage magnetic path breaking sections 50 are so formed that the apex of the section reaches the substantially middle portion in the radial direction of the main magnetic pole 30. In this case, the anisotropic permanent magnets constituting the main magnetic poles 30 respectively have the boundary for defining the N pole and the S pole at the central portion in the radial direction, which substantially performs the same leakage magnetic path breaking function as the above-mentioned embodiment. Further, the position of the main magnetic poles 30 in the circumferential direction can be certainly determined by the non-magnetic substances 60.

Figure 8:
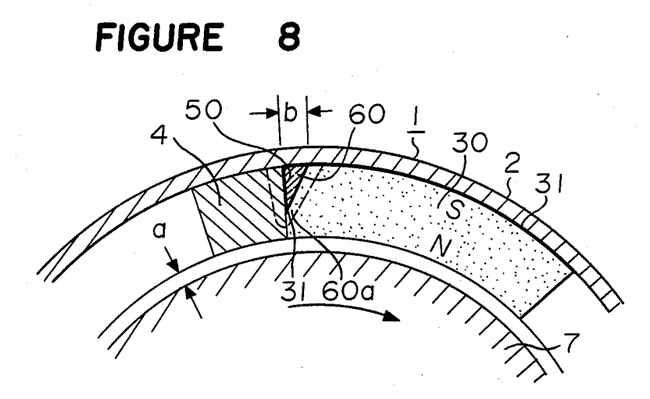
FIG. 8 is an enlarged cross-sectional view of another embodiment of a stator used for the permanent magnet DC machine according to the present invention.
Figure 9:
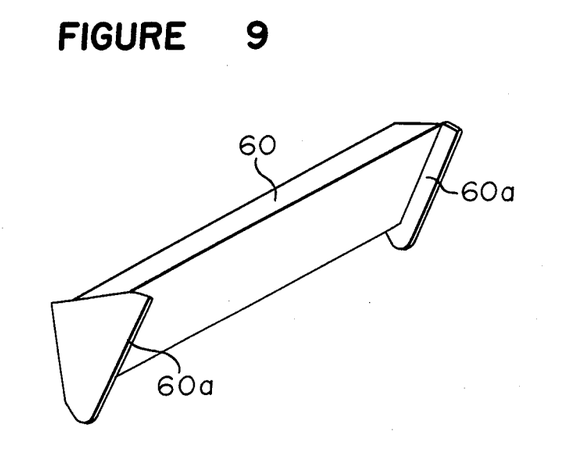
FIG. 9 is a perspective view showing an embodiment of the non-magnetic substance for the permanent magnet DC machine according to the present invention.

FIGS. 8 and 9 show another embodiment of the present invention. In this embodiment, guide pieces 60a are respectively attached to both ends in the axial direction of each of the non-magnetic substances 60 in a form of a rectangular prism so that the non-magnetic substances 60 and the main and auxiliary magnetic poles 30, 4 can be correctly positioned with respect to their axial directions by contacting the guide pieces 60a with the end faces of the main and auxiliary magnetic poles 30, 4. With the non-magnetic substances 60 with the guide pieces, assembling work can be easier.

Figure 10:
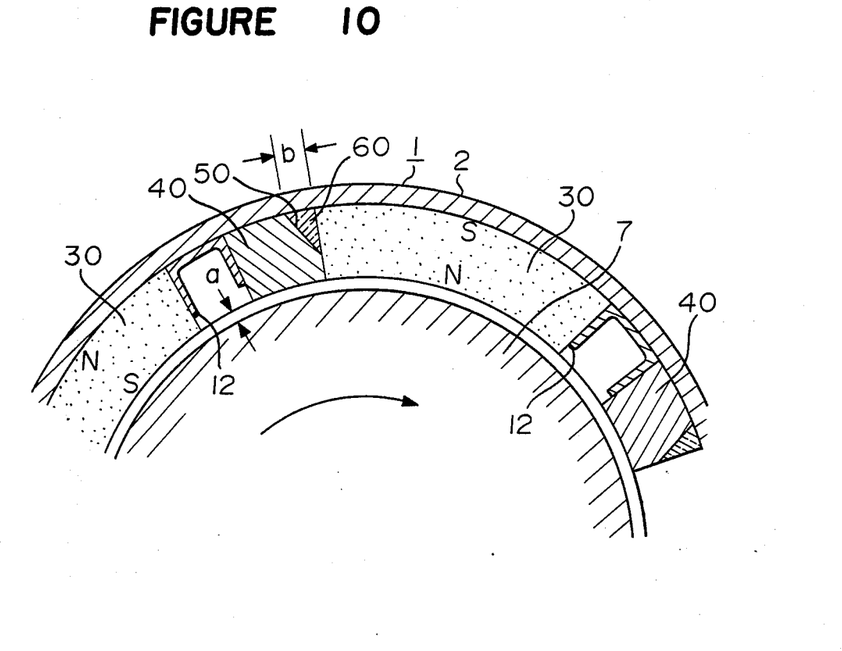
FIG. 10 is an enlarged cross-sectional view of an embodiment of the stator for the permanent magnet DC machine according to the present invention.

FIG. 10 shows another embodiment of the present invention. Namely, an elastic member 12 such as a plate spring in a form of a channel may be interposed between the main magnetic poles 30 and the auxiliary magnetic poles 40 which are adjacent to each other with a gap in the circumferential direction of the stator 1. Namely, in FIG. 10, a cut portion is formed in each of the auxiliary magnetic poles 40 to form leakage magnetic path breaking sections 50 respectively.

Assembling work for field magnetic poles in the embodiment as shown in FIG. 10 will be described. The auxiliary magnetic poles 40 are attached to the inner circumferential surface of the yoke 2 by welding. Then, the non-magnetic substances 60 having a triangular shape in cross section are respectively arranged along the right side surface of each of the auxiliary magnetic poles 40 and the inner circumferential surface of the yoke 2 whereby leakage magnetic path breaking sections 50 each having a circular arc portion whose length is greater than the air gap a formed between the rotor 7 and the stator 1 is formed. The position of the main magnetic poles 30 is determined by making each of the main magnetic poles contact with both the right side surfaces of the non-magnetic substances 60 and the auxiliary magnetic poles 40 and the inner circumferential surface of the yoke 2. Then, plate springs in a channel form 12 are respectively forcibly inserted in the gap formed between the main magnetic poles 30 and the auxiliary magnetic poles 40 which are adjacent to each other with the gaps to thereby the main magnetic poles 30 are urged to the auxiliary magnetic poles 40 which are to be in close-contact with the same. Thus, the main magnetic poles 30 are fixed by the pressing force of the plate springs 12.

In the embodiment as shown in FIG. 10, the adhesive agent 31 can be eliminated, or it is enough to use a small amount of it since the non-magnetic substances 60 and the main magnetic poles 30 can be fixed by the pressing force of the plate springs 12.

As described above, in accordance with the embodiments as shown in FIGS. 1 to 9, the leakage magnetic paths between the adjacent main and auxiliary magnetic poles are interrupted by the non-magnetic substances to thereby improve torque characteristics. Further, a waveform in distribution of magnetic flux can be smooth, and assembling work can be improved because positioning of the main magnetic poles in the circumferential direction can be easy by using the non-magnetic substances.

In accordance with the embodiment of the present invention as shown in FIG. 10, the same function and effect are obtainable. Further, an adhesive agent can be eliminated or minimized by using elastic members to fix the main magnetic poles, and the assembling work for the main magnetic poles can be carried out in a short time.

Obviously, numerous modifications and variations of the present invention are possible in light of the above teachings. It is therefore to be understood that within the scope of the appended claims, the invention may be practiced otherwise than as specifically described herein.

What is claimed is:

1. A method of preparing a permanent magnet DC machine which comprises:
    attaching by welding auxiliary magnetic poles having higher reversible permeability than that of main magnetic poles constituted by anisotropic permanent magnets which are to be attached to the inner circumferential surface of a yoke;
    joining a non-magnetic substance having a triangular shape in cross section to a side surface of each of said auxiliary magnetic poles and the inner circumferential surface of said yoke so as to form a leakage magnetic path breaking section at the radially outer part of each of said non-magnetic substances, the length of said leakage magnetic path breaking section being greater than the air gap formed between a rotor and a stator;
    positioning said main magnetic poles of anistropic permanent magnets with respect to the other side surface of each of said non-magnetic substances and the inner circumferential surface of said yoke; and
    fixing by an adhesive agent said main magnetic poles on the inner circumferential surface so as to adjoin said auxiliary magnetic poles through said non-magnetic substances.

2. The method of preparing a permanent magnet DC machine according to claim 1, wherein said auxiliary magnetic poles are respectively in contact with the adjacent main magnetic poles at the radially inner part.

3. The method of preparing a permanent magnet DC machine according to claim 1, wherein the non-magnetic substance is made of a resinous material.

4. The method of preparing a permanent magnet DC machine according to claim 1, wherein the non-magnetic substance is in a form of a generally triangular prism.

5. The method of preparing a permanent magnet DC machine according to claim 1, wherein the non-magnetic substances are attached to the yoke with an adhesive agent.

6. A method of preparing a permanent magnet DC machine which comprises:
    attaching by welding auxiliary magnetic poles having higher reversible permeability than that of main magnetic poles constituted by anisotropic permanent magnets which are to be attached to the inner circumferential surface of a yoke;
    arranging a non-magnetic substance having a triangular shape in cross section to a side surface of each of said auxiliary magnetic poles and the inner circumferential surface of said yoke so as to form a leakage magnetic path breaking section at the radially outer part of each of said non-magnetic substances, the length of said leakage magnetic path breaking section being greater than the air gap formed between a rotor and a stator;

positioning said main magnetic poles of anistropic permanent magnets with respect to the other side surface of each of said non-magnetic substances and the inner circumferential surface of said yoke; and fixing said main magnetic poles by a pressing force obtained by inserting elastic members between the main magnetic poles and the auxiliary magnetic poles as field magnetic poles which are adjacent to each other.

7. The method of preparing a permanent magnet DC machine according to claim 6, wherein said elastic members are plate springs in a form of a channel which are forcibly inserted in the gaps between the main magnetic poles and the auxiliary magnetic poles, the later belonging adjacent groups of the main and auxiliary magnetic poles.

8. The method of preparing a permanent magnetic DC machine according to claim 6, wherein said auxiliary magnetic poles are respectively in contact with the adjacent main magnetic poles at the radially inner part.

9. The method of preparing a permanent magnet DC machine according to claim 6, wherein the non-magnetic substance is made of a resinous material.

10. The method of preparing a permanent magnet DC machine according to claim 6, wherein the non-magnetic substance is in a form of a generally triangular prism.

11. The method of preparing a permanent magnet DC machine according to claim 6, wherein the non-magnetic substances are attached to the yoke with an adhesive agent.

* * * * *

UNITED STATES PATENT AND TRADEMARK OFFICE
CERTIFICATE OF CORRECTION

PATENT NO. : 4,918,830
DATED : APRIL 24, 1990
INVENTOR(S) : HIROAKI ASO

It is certified that error appears in the above-identified patent and that said Letters Patent is hereby corrected as shown below:

ON TITLE PAGE:

In the inventor, please delete "Mitsubishi Denki Kabushiki Kaisha Himeji Seisakusho, 840, Chiyoda-cho, Himeji-shi, Hyogo-ken, Japan"; and insert after inventor's name --Himeji-shi, Japan--;

Insert the Assignee as --Mitsubishi Denki Kabushiki Kaisha, Tokyo, Japan;

Insert the attorney, agent, or firm as --Oblon, Spivak, McClelland, Maier & Neustadt--.

Signed and Sealed this

Twenty-seventh Day of August, 1991

Attest:

HARRY F. MANBECK, JR.

Attesting Officer

Commissioner of Patents and Trademarks